US006850998B2

(12) United States Patent
Inoue et al.

(10) Patent No.: US 6,850,998 B2
(45) Date of Patent: Feb. 1, 2005

(54) DISK ARRAY SYSTEM AND A METHOD FOR CONTROLLING THE DISK ARRAY SYSTEM

(75) Inventors: Mitsuru Inoue, Hiratsuka (JP); Kazuhisa Fujimoto, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 88 days.

(21) Appl. No.: 10/217,413

(22) Filed: Aug. 14, 2002

(65) Prior Publication Data

US 2003/0046460 A1 Mar. 6, 2003

(30) Foreign Application Priority Data

Sep. 6, 2001 (JP) ........................................ 2001-270940

(51) Int. Cl.[7] .............................................. G06F 13/14
(52) U.S. Cl. ........................... 710/38; 710/39; 710/110; 710/305; 710/316; 711/114; 711/147; 711/148
(58) Field of Search ............................. 710/38, 39, 110, 710/305, 316; 711/114, 147, 148

(56) References Cited

U.S. PATENT DOCUMENTS

| | | | | |
|---|---|---|---|---|
| 5,544,339 A | * | 8/1996 | Baba .......................... | 711/114 |
| 5,978,856 A | * | 11/1999 | Jones ......................... | 711/114 |
| 6,108,752 A | * | 8/2000 | VanDoren et al. ........... | 711/117 |
| 6,115,797 A | * | 9/2000 | Kanda et al. ................ | 711/147 |
| 6,222,564 B1 | * | 4/2001 | Sturges ....................... | 345/531 |
| 6,397,292 B1 | * | 5/2002 | Venkatesh et al. .......... | 711/114 |
| 6,633,946 B1 | * | 10/2003 | Hendel ....................... | 710/317 |

FOREIGN PATENT DOCUMENTS

| | | |
|---|---|---|
| JP | A-05-197495 | 8/1993 |
| JP | A-10-333836 | 12/1998 |
| JP | A-11-175260 | 7/1999 |

* cited by examiner

Primary Examiner—Rehana Perveen
(74) Attorney, Agent, or Firm—Antonelli, Terry, Stout & Kraus, LLP

(57) ABSTRACT

In a disk array system of the present invention, each host or disk interface unit is connected to each shared memory unit through a switch unit. The switch unit includes the number of packet buffers greater than the number of the host or disk interface units connected thereto, and can always hold the number of access requests greater than the number of the host or disk interface units. The disk array system uses the packet buffers to compensate for a transfer rate difference between the host interface units and the shared memory units, thereby allowing connection of the host interface units having different performance. The disk array system improves the efficiency of usage of internal paths without increasing the number of I/O ports of the switch unit. The system throughput is thereby improved, and the support for host I/Fs having different performance is thereby facilitated.

21 Claims, 7 Drawing Sheets

DISK ARRAY SYSTEM AND A METHOD FOR CONTROLLING THE DISK ARRAY SYSTEM

CROSS-REFERENCE TO RELATED APPLICATION

The basic foreign Application filed on Sep. 6, 2001, No. 2001-270940 in Japan is hereby incorporated by reference.

FIELD OF THE INVENTION

The present invention relates to a disk array technique. More specifically, the invention relates to a technique that is effective in being applied to configuration of and control over an access path for a shared memory in a disk array control device that constitutes a disk subsystem or disk array system.

BACKGROUND OF THE INVENTION

Although magnetic disk subsystems are widely employed as a secondary storage device for a computer, their I/O performance is always lower than the I/O performance of a main storage by three to four orders of magnitude. Thus, efforts have long been made to reduce this difference. As a method of improving the I/O performance of the subsystem, there is known a disk array system in which a plurality of magnetic disk drives are operated in parallel to distribute data for storage in these plurality of magnetic disk drives.

In the disk array system, by operating a plurality of the disk drives in parallel, the I/O performance and the throughput performance of the system during sequential access can be improved. However, it is necessary to perform data transfers concurrently with a plurality of the magnetic disk drives. Thus, in order to improve the performance of the system, the high data transfer performance is required for the internal paths of the disk array control device as well, which connects the disk drives and the host I/F units.

FIG. 1 is a conceptual diagram showing a disk array system including a disk array control device, which shows a related art according to the present invention. A disk array control device 200 in FIG. 1 for reference comprises host interface units 220, disk interface units 230, and shared memory units 240, all of which are interconnected by a common bus 210. A host interface unit 220 comprises a channel I/F circuit 120 and a processor 110, and controls exchange of data with a host computer 300. A disk interface unit 230 comprises a disk I/F circuit 150 and a processor 140, and controls exchange of data with a plurality of disk drives 500. A shared memory unit 240 temporarily stores control information for the system and data to be written into the disk drives. (A disk array having such a configuration will be provisionally referred to as a shared-bus-connected disk array.)

Generally, in this configuration of the shared-bus-connected disk array, a throughput of the common bus 210 becomes a bottleneck of a system performance. In most cases, the throughput of the bus is determined by its data bus width and operating frequency. In the case of the common bus, both the bus width and the operating frequency are almost approaching their limits in recent years, so that there has been no improvement in the system performance of the shared-bus-connected disk array.

In order to overcome this problem, JP-A-10-333836 discloses a disk array having a configuration where a plurality of interface units connected to host computers and interface units connected to a plurality of magnetic disk drives are connected to a plurality of shared memory units through an interconnection network using a switch. The respective host interface units and the respective magnetic disk interface units make access to a shared memory unit by way of the switch of the interconnection network. (A disk array of such a configuration will be provisionally referred to as a starnet connection disk array.)

Since the physical number of connection paths between the shared memory units and the switch (memory connection paths) is greater than the physical number of paths between the shared memory units and the common bus for the shared-bus-connected disk array, the number of connection paths per starnet connection disk array is extremely greater than the number of connection paths per shared-bus-connected disk array, though the transfer throughput of a single connection path in the starnet connection disk array cannot be increased as compared with the transfer throughput of a single common bus due to the constraints of the physical number of pins. Accordingly, the threshold transfer throughput of the entire starnet disk array system is large, thus allowing improvement in the system performance. Since the number of the connection paths is increased by addition of the host interface units, magnetic disk interface units, or shared memory units, the system performance is improved in proportion to addition of functional units. In this sense, the starnet connection disk array would be a scalable architecture.

With a rapid improvement in the performance of a host computer and a faster network, market requirements for the performance of the disk array system have been much more increased. On contrast therewith, in the shared-bus-connected disk array, an improvement in the system performance is becoming difficult due to the bottleneck in the performance of the common bus, so that the shared-bus-connected disk array cannot satisfy the market requirements. On the other hand, in the starnet connection disk array, as described above, by increasing the number of the connection paths, an improvement in the throughput performance of the system would be possible.

However, even in the starnet connection disk array, the number of the connection paths is actually limited due to the constraints of installation. Therefore, just by increasing the number of the connection paths, a further improvement in the performance of the system is not expected. Further, even if paths for one-to-one connection are employed between the respective interface units and the switch, and between the switch and the respective shared memory units, there exists a limit to the operating frequency of the paths. Thus, an improvement in the performance of a single connection path is also limited. Accordingly, it becomes necessary to improve the throughput of the internal paths in the system, on condition that the number of the connection paths is limited.

The starnet connection disk array aims at improvement in the throughput of the internal paths in the entire system, by simultaneous operation of a plurality of connection paths. In disk arrays in general, access requests from a plurality of the host interface units and a plurality of the disk interface units to the shared memory units are not distributed evenly among the shared memory units. On a memory connection path to a shared memory unit into which access requests have been concentrated, the access requests should wait at the switch (interconnection network) on the path. On the other hand, until an access request is generated, a memory connection path to a shared memory unit, to which no access request has been sent, will not operate. Consequently, there develop memory connection paths that do not operate simultaneously at a given time, which has become a factor in limiting the throughput of the internal paths in the starnet connection disk array.

In order to address the technical problem described above, in the starnet connection disk array, there is provided a proposal that the number of connection paths between the host interface units and the switch and between the disk interface units and the switch is made to be greater than the number of the memory connection paths between the switch and the shared memory units. According to this method, a proportion of the memory connection paths between the switch and the shared memory units, which will be used simultaneously is increased. However, the number of the connection paths that can be used simultaneously is determined by the number of the memory connection paths between the switch and the shared memory units. Thus, the effect of improving the maximum throughput of the system would be low. Accordingly, the challenge to be addressed is to increase the number of the memory connection paths between the switch and the shared memory units, which will operate simultaneously, without unnecessarily increasing the number of the connection paths between the host interface units and the switch and between the disk interface units and the switch.

With the increased use of open systems in recent years, it is strongly required that even a disk array support multiplatforms. In other words, the demand for supporting both a high-speed I/F and a low-speed I/F on a single disk array system is keen. The high-speed I/F is represented by a fiber channel, and its throughput reaches 100 MB/s, while the low-speed I/F such as a main frame channel and a Small Computer System Interface (SCSI) channel has its throughput of approximately several tens of MB/s. These must be developed simultaneously in a short period. For this purpose, it is effective that new development of a host interface board for old I/F, the decline of which is expected in the future, is not performed, and that the old model of host interface board can be used as it is without affecting the system performance. Normally, when the starnet connection disk array is made into a new model, the transfer throughput of the connection paths is often improved as means for improving the system performance. In order to effect the above-mentioned purpose, when using the old host interface board, it becomes necessary that the transfer throughput of memory connection paths connecting the switch and the shared memory units is improved while setting the physical I/F and the operating frequency of paths connecting the host interface units to the switch, and connecting disk interface units to switch, to the values of the old model. Hence, the challenge is that the paths connecting the host interface units and the disk interface units to the switch and the memory connection paths connecting the switch to the shared memory units can be operated with their transfer throughputs being different to each other.

SUMMARY OF THE INVENTION

A first object of the present invention is to provide a disk array system with a high throughput of transferring data between a host interface unit, a disk interface unit, and a shared memory without increasing the number of connection paths more than necessary. This object is accomplished by improving the usage status of a connection path between switching means and the shared memory unit.

Further, a second object of the present invention is to provide a disk array system that can easily support a plurality of different host I/F channels by causing connection paths between the host interface unit and the switching means, between the disk interface unit and the switching means, and between the switching means and the shared memory unit to have different transfer throughputs.

According to the present invention, in a starnet connection disk array, a switch unit has the function of temporarily holding the number of data packets greater than the number of connection paths physically connecting the switch unit to a host interface unit and a disk interface unit. The host interface unit and the disk interface unit operate such that the number of data packets that can be held by the switch unit is held in the switch unit.

In other words, the host interface unit and the disk interface unit transmit to the switch unit a plurality of data packets that can be held by the switch unit through a single connection path while communicating with the switch unit through a control line. On the other hand, by arbitration, the switch unit selects a packet indicating a request to access a connection path to a shared memory unit that can be used, and communicates with the shared memory unit. With this arrangement, the number of data packets that are arbitrated at the switch unit can be increased. The same effect as that when the number of connection paths connecting the host interface units and the disk interface units to the switch unit is made to be larger than the number of connection paths between the switch unit and the shared memory units can be obtained. A proportion of connection paths between the switch unit and the shared memory units that operate simultaneously is thus improved, thereby allowing the throughput of the system to be increased.

When the host interface unit and the disk interface unit respectively include a plurality of external interfaces which operate in parallel, a shared memory unit to be accessed might be different, depending on the external interface. Thus, in this case, the above-mentioned means becomes more effective.

In the present invention, the switch unit has a function capable of changing the operating frequency of a connection path between a host interface unit and the switch unit according to the type of the host interface unit. The switch unit has a function of temporarily holding data packets. Thus, by combination with the function described above, even if the transfer throughput of a connection path between a host interface unit and the switch unit and the transfer throughput of a connection path between the switch unit and a shared memory unit are different, they can be operated. Thus, an old host interface board having a low-speed connection path can be connected without alteration, without hindering an improvement in the throughput of the system.

According to the present invention, by improving the usage status of a connection path between the switch unit and a shared memory unit, a disk array system with a high throughput of transferring data between a host interface unit, a disk interface unit, and a shared memory can be provided, without increasing the number of connection paths more than necessary.

According to the present invention, it is possible to make a connection path between a host interface unit and the switch unit, between a disk interface unit and the switch unit, and a connection path between the switch unit and a shared memory unit to have different transfer throughputs. Thus, a disk array system that can easily support a plurality of different host I/F channels can be provided.

Other objects, features and advantages of the invention will become apparent from the following description of the embodiments of the invention taken in conjunction with the accompanying drawings.

BRIEF DESCRIPTION OF THE DRAWINGS

Preferred embodiments of the present invention will now be described in conjunction with the accompanying drawings, in which.

DESCRIPTION OF THE EMBODIMENTS

An embodiment of the present invention will be described in detail with reference to the appended drawings.

Figure 1:
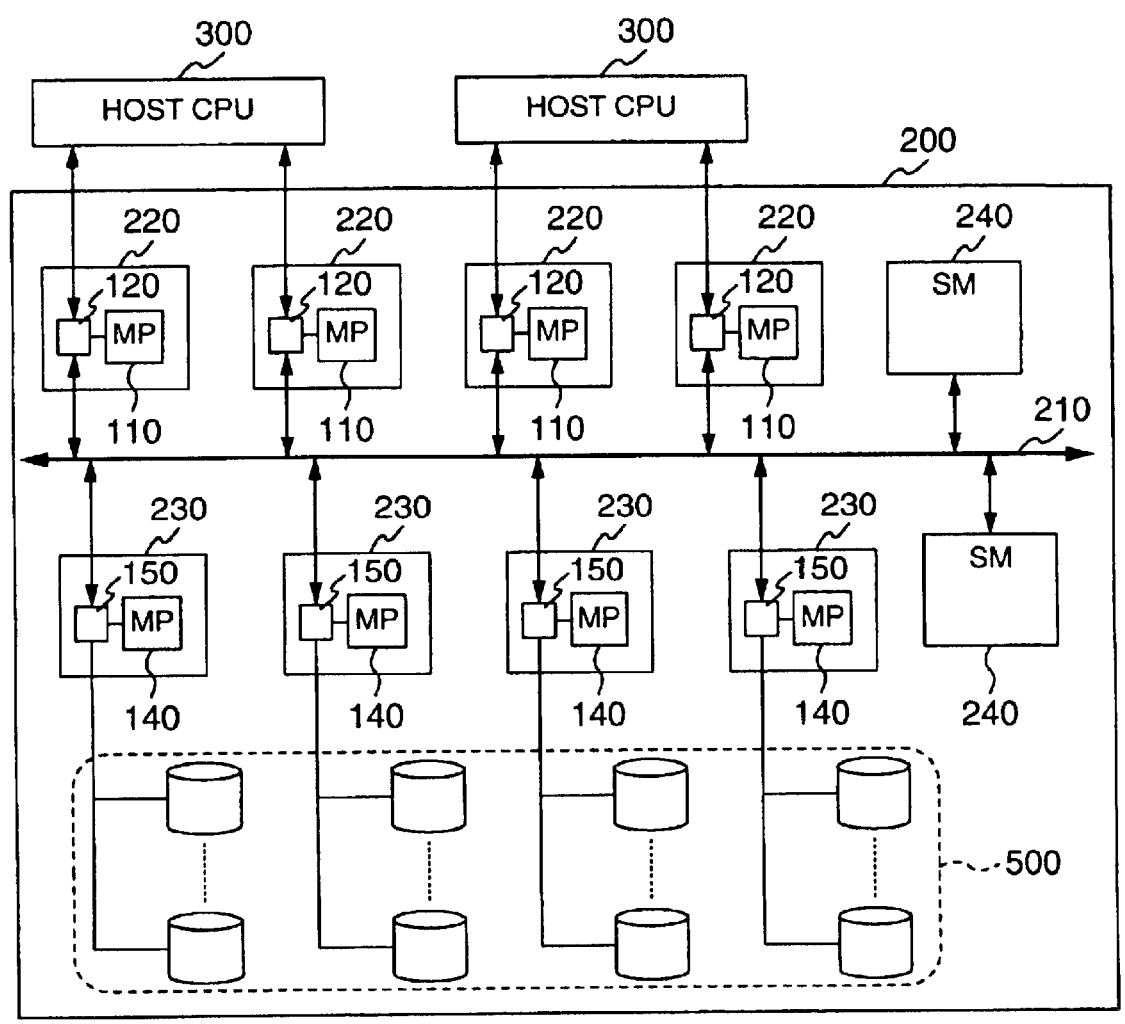
FIG. 1 is a conceptual diagram showing a disk array system including a disk array control device that is a related art of the present invention.
Figure 2:
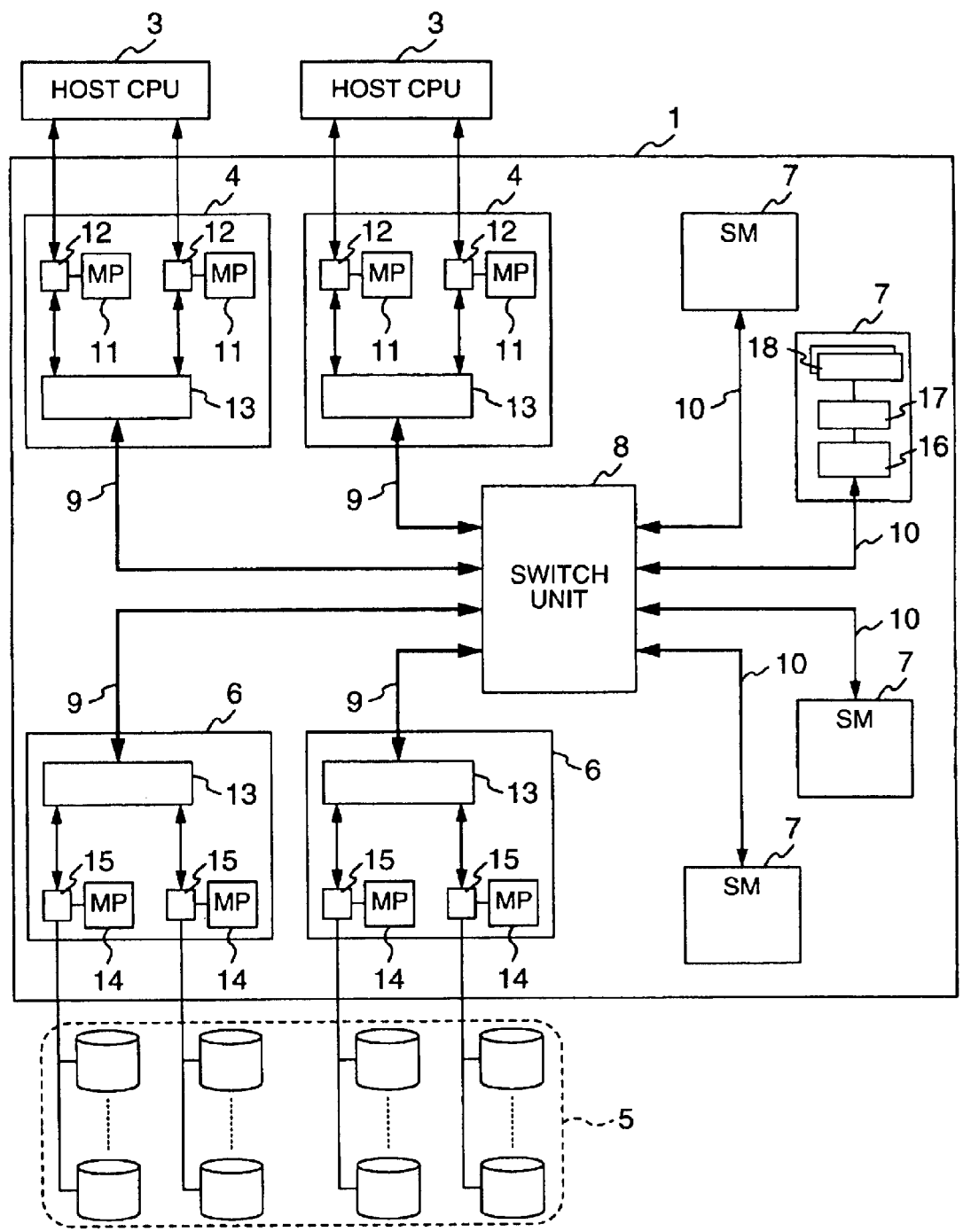
FIG. 2 is a conceptual diagram showing a configuration of a disk array system including a disk array control device that carries out a control method according to an embodiment of the present invention.

FIG. 2 is a conceptual diagram showing a configuration of a disk array system including a disk array control device that carries out a control method according to an embodiment of the present invention.

The disk array system according to this embodiment comprises a plurality of disk drives 5 that constitutes a disk array and a disk array control device 1 for controlling these drives.

The disk array control device 1 comprises host interface units 4 connected to a plurality of host computers (host CPUs 3), disk interface units 6 connected to a plurality of the disk drives 5, a switch unit 8, and shared memory units 7 for temporarily storing control information on the system and data to be written into the disk drives 5.

The respective host interface units 4, respective disk interface units 6 are interconnected to the switch unit 8 by a plurality of separate paths 9, which will be hereinafter referred to as M paths 9. Likewise, the switch unit 8 is connected to the respective shared memory units 7 by a plurality of separate paths 10. The paths 10 will be hereinafter referred to as S paths 10. The host interface units 4 and the disk interface units 6 make access to the shared memory units 7 through the switch unit 8.

In this embodiment, two host interface units 4, two disk interface units 6, and four shared memory units 7 are connected to the switch unit 8. However, if the number of these units is set to be different, there arises no problem in carrying out the present invention. Nevertheless, if the total number of the host interface units 4 and the disk interface units 6 connected to the switch unit 8 is the same as the number of the shared memory units 7 connected to the switch unit 8, the greater effect of the present invention would be expected.

A host interface unit 4 comprises two processors (CHP) 11 for controlling the host interface unit 4, two channel I/F circuits 12 for performing data transfer between a host CPU 3 and a shared memory unit 7 and between a CHP 11 and the shared memory unit 7 in response to a command from the CHP 11, and a shared memory access control unit 13 for performing communication control between the channel I/F circuits 12 and the switch unit 8. Each of the two channel I/F circuits 12 is connected to the shared memory access control unit 13 by a dedicated path.

A disk interface unit 6 comprises two processors (DKPs) 14 for controlling the disk interface unit 6, two disk I/F circuits 15 for performing data transfer between the disk drives 5 and the shared memory units 7 or between the DKPs 14 and the shared memory units 7 in response to a command from a DKP 14, and a shared memory access control unit 13 for performing communication control between the disk I/F circuits 15 and the switch unit 8. Each of the two disk I/F circuits 15 is connected to the shared memory access control unit 13 by a dedicated path.

The switch unit 8 analyzes requests to access a shared memory unit 7, transmitted from a host interface unit 4 or a disk interface unit 6 through an M path 9, and at the same time selects an issuable access request to issue the access request to the shared memory unit 7 through an S path 10. One feature of this embodiment is that the switch unit 8 can simultaneously receive a plurality of access requests through a single M path 9. The configuration of the switch unit 8 for realizing this feature will be described later with reference to FIG. 4.

A shared memory unit 7 comprises an S path I/F unit 16, a memory control unit 17, and a plurality of memory modules 18 interconnected in this stated order. The shared memory unit 7 analyzes an access request transmitted through the switch unit 8 to perform data reading into or writing from a memory module 18.

When a host CPU 3 performs data reading from the disk array control device 1, the request to read the data is first transmitted to a CHP 11 through a channel I/F circuit 12. Next, the CHP 11 reads control information in a shared memory unit 7 through the channel I/F circuit 12, shared memory access control unit 13, and switch unit 8 to check whether the requested data is present in the shared memory unit 7. When the requested data is present in the shared memory unit 7, the CHP 11 reads the data to be read in the shared memory unit 7 through the same path as that used for reading the control information, and then transmits the read data to the host CPU 3. When the request data is not present, the CHP 11 transmits a command to the DKP 14 of a disk interface unit 6 through the shared memory unit 7 so that DKP 14 reads the data to be read in a disk drive 5 and writes the data into the shared memory unit 7. The DKP 14 that received the command uses a disk I/F circuit 15 for performing data transfer between the disk drive 5 and the shared memory unit 7 to transfer the data to the shared memory unit 7. After the transfer, the DKP 14 reports completion of the data transfer to the shared memory unit 7 to the CHP 11 from which data reading was requested. These communications are performed from the channel I/F circuit 12 or disk I/F circuit 15, shared memory access control unit 13, switch unit 8 to the shared memory unit 7.

After receiving the report on completion of the data transfer, the CHP 11 reads the data in the shared memory unit 7 through the channel I/F circuit 12, shared memory access control unit 13, and switch unit 8, and then transmits the requested data to the host CPU 3.

When a host CPU 3 performs data writing into the disk array control unit 1, the request to write the data is first transmitted to a CHP 11 through a channel I/F circuit 12. Next, the CHP 11 writes the data in a shared memory unit 7 through the channel I/F circuit 12, a shared memory access control unit 13, and the switch unit 8. Likewise, the CHP 11 notifies the DKP 14 of a disk interface unit 6 of writing of the data in the shared memory unit 7 through the shared memory unit 7. Further, at this point, the CHP 11 issues a notification indicating completion of data writing to the host CPU 3. The DKP 14 that received the notification uses a disk I/F circuit 15 for performing data transfer between a disk drive 5 and the shared memory unit 7. The DKP 14 reads the data from the shared memory unit 7 through the disk I/F circuit 15, shared memory access control unit 13, switch unit 8, and shared memory unit 7 and then writes the read data into the disk drive 5.

Figure 3:
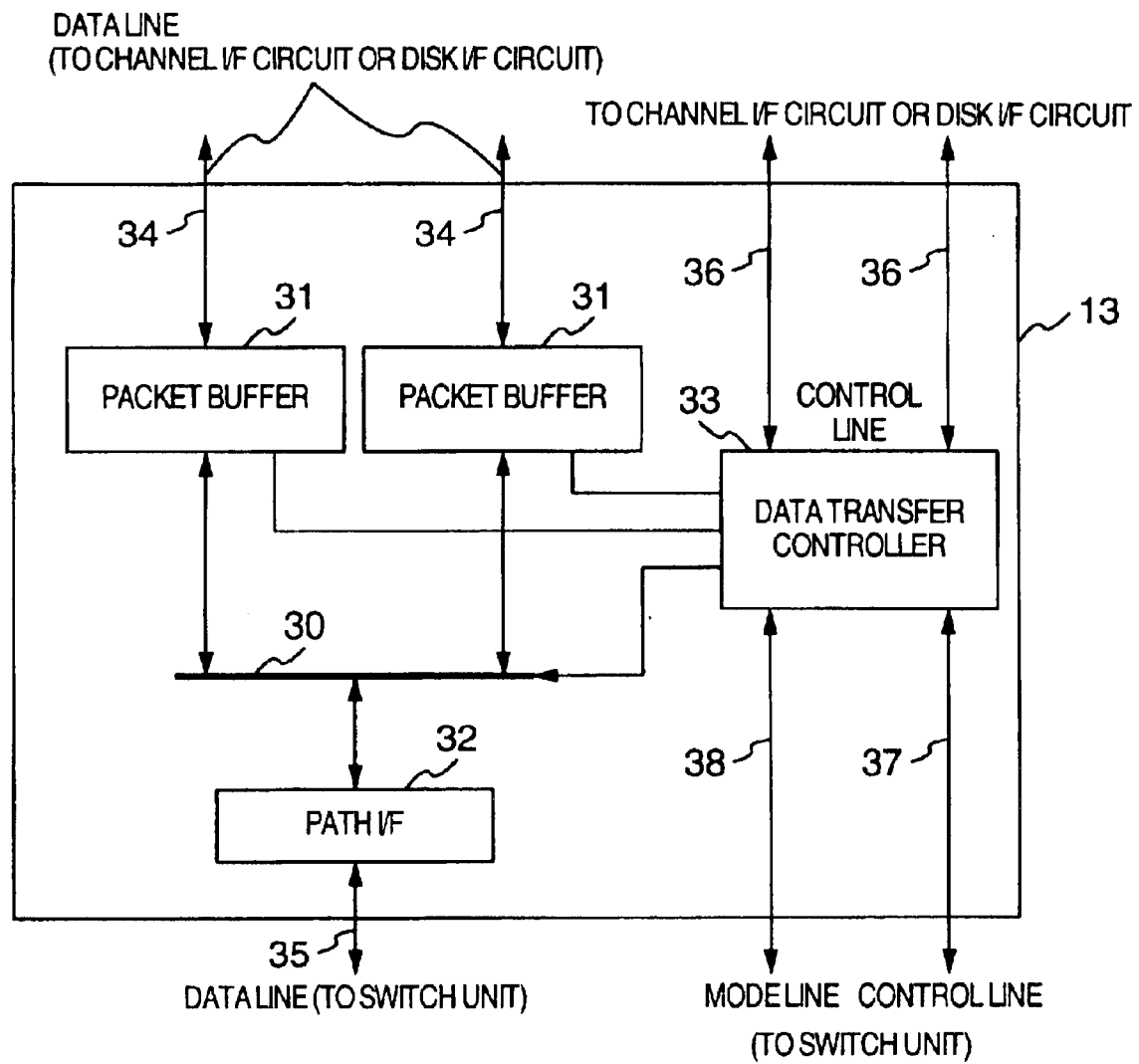
FIG. 3 is a conceptual diagram showing a configuration of a shared memory access control unit in the disk array control device that carries out the control method according to the embodiment of the present invention.

FIG. 3 is a conceptual diagram showing a configuration of a shared memory access control unit 13. The shared memory access control unit 13 comprises one selector 30, two packet buffers 31 each temporarily storing one packet of an address, a command, and data, one path I/F 32 provided between the selector 30 and the switch unit 8, and one data transfer control unit 33 for controlling the above-mentioned units. Each of two ports of the selector 30 is connected to a channel I/F circuit 12 or a disk I/F circuit 15 through a data line 34 via a packet buffer 31. On the other hand, other one port of the selector 30 is connected to one M path port of the switch unit 8 through a data line 35 via the path I/F 32. The data transfer control unit 33 is connected to two channel I/F circuits 12 or two disk I/F circuits 15 through control lines 36. On the other hand, the data transfer control unit 33 is connected to an M path control unit 47 in the switch unit 8 through a MODE line 38 that indicates the operating frequencies of a control line 37 and the M path 9 to the switch unit 8. One set of the data line 35, control line 37, and MODE line 38 corresponds to one M path 9.

A data transfer control unit 33 performs arbitration for access requests from two channel I/F circuits 12 or two disk I/F circuits 15, switches a selector 30 while communicating with the switch unit 8 using a control line 37, and performs data transfer with the switch unit 8. At this time of the data transfer, the data transfer control unit 33 does not merely switch the selector 30 for each transfer of one packet of data, but performs control such that two packets of data transfer requests are held in the switch unit 8 as long as possible, based on information indicated by the control line 37.

Figure 4:
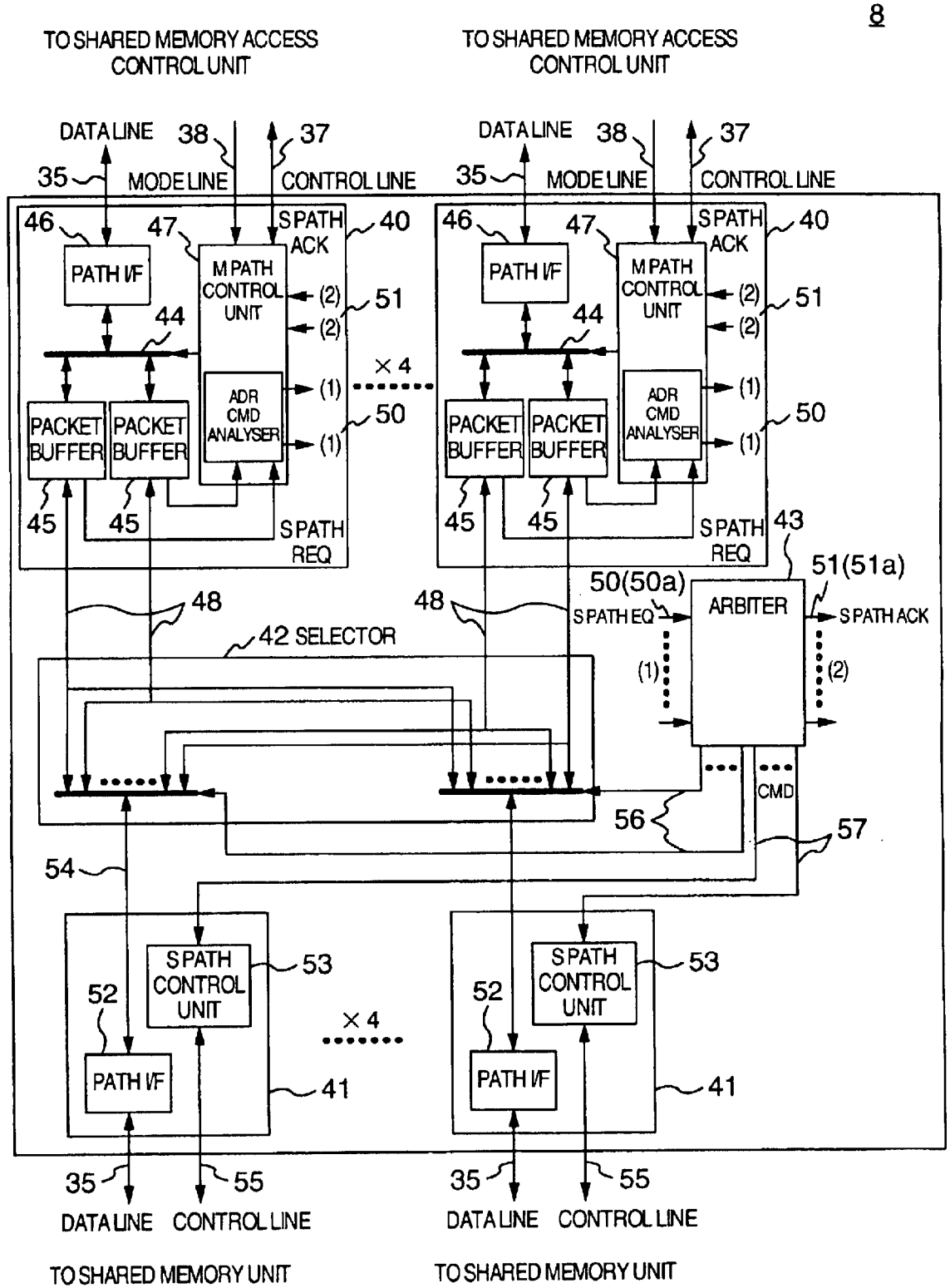
FIG. 4 is a conceptual diagram showing a configuration of a switch unit in the disk array control device that carries out the control method according to the embodiment of the present invention.

FIG. 4 is a conceptual diagram showing a configuration of the switch unit 8. The switch unit 8 roughly comprises four M path port units 40 connected to the host interface units 4 and the disk interface units 6 by the M paths 9, four S path port units 41 connected to the shared memory units 7 by the S paths 10, a selector unit 42 connecting the M path port units 40 and the S path port units 41, and an arbiter 43 for arbitrating a right to use an S path port unit 41 among access requests from a plurality of the M path port units 40.

An M path port unit 40 comprises one selector 44, two packet buffers 45 each temporarily storing one packet of an address, a command, and data therein, one path I/F 46 connected to the shared memory access control unit 13 of a host interface unit 4 or a disk interface unit 6, and one M path control unit 47 for controlling the above-mentioned units in the M path port unit 40. One port on one side of the selector 44 is connected to the channel I/F circuit 12 or the disk I/F circuit 15 through a data line 35 through the path I/F 46, while two ports on the opposite side of the selector 44 are connected to the M path side of the selector unit 42 through data lines 48 through the two packet buffers 45. While connected to the data transfer control unit 33 of the host interface unit 4 or the disk interface unit 6 through a control line 37 and a MODE line 38, the M path port unit 40 is connected to the arbiter 43 through an S path REQ line 50 and an S path ACK line 51.

An S path port unit 41 comprises an S path control unit 53 and one path I/F 52 connected to an S path I/F unit 60 of a shared memory unit 7. The path I/F 52 is connected to the selector unit 42 through a data line 54 and is also connected to a path I/F 68 of the shared memory unit 7. The S path control unit 53 is connected to an S path control unit 62 of the shared memory unit 7 through a control line 55.

An access request from a shared memory access control unit 13 is written into a packet buffer 45 of an M path port unit 40 through an M path 9, as a data packet including an access destination (ADR), access command (CMD), and data to be written (just for the purpose of data writing) (hereinafter referred to as "a data packet"). The M path control unit 47 analyzes the ADR/CMD in the packet buffer 45, and issues a request to use an S path 10 (S path REQ 50a) to the arbiter 43.

The arbiter 43 performs arbitration for access requests from four M path control units 47, gives a switching command 56 for the selector unit 42, a command to start to transfer data on an S path ACK 51a, and an access command notification 57 to a target M path port unit 40 and a target S path port unit 41. Upon receipt of the access command notification 57, the M path port unit 40 communicates with the data transfer control unit 33 of a host interface unit 4 or a disk interface unit 6 through a control line 37. Upon receipt of the access command notification 57, the S path port unit 41 makes access to a single shared memory unit while communicating with the S path control unit 62 of the shared memory unit 7 through a control line 55.

Since each M path port unit 40 includes two packet buffers 45, it can receive two accesses simultaneously. Due to the communication using a control line 37, the shared memory access control unit 13 of a host interface unit 4 or a disk interface unit 6 operates such that each M path port unit 40 holds two access requests as long as possible. For this reason, when the arbitration is performed, four S paths 10 are brought into a state of contention due to eight access requests on the M paths 9. Thus, the probability of simultaneous use of four S paths 10 is high, so that effective use of the total bandwidth occupied by the four S paths 10 can be made.

A packet buffer 45 operates as an elastic buffer to compensate for a difference between the transfer rate of the M path 9 and the transfer rate of the S path 10. This embodiment enables two-stage transfer rate settings of the M path 9. The data transfer control unit 33 of a shared memory access control unit 13 notifies the switch unit 8 of the transfer rate through a MODE line 38 supplied from the data transfer control unit 33. When the MODE line 38 of the switch unit 8 indicates LOW, an M path control unit 47 determines this state to be a high-speed mode in which the transfer rate of the M path 9 is the same as the transfer rate of the S path 10, so that causes a path I/F 46 to operate at the same rate as the S path 10. On the other hand, when the MODE line 38 of the switch unit 8 indicates HIGH, the M path control unit 47 determines this state to be a low-speed mode in which the transfer rate of the M path 9 is half the transfer rate of the S path 10, so that causes the path I/F 46 to operate at a speed half as fast as the S path 10. In both cases, an M path port unit 40 issues a request to use an S path to the arbiter 43 after one packet of data is stored in a packet buffer 45. Accordingly, it becomes possible to always send a data packet onto the S path at the same rate as that of the S path 10. Thus, even if the bandwidth of the M path 9 is low, the bandwidth of the S path 10 is not wasted. Further, when reading data from a shared memory unit 7 as well, the data is sent onto an M path 9 after the necessary amount of read data is stored in a packet buffer 45. With this arrangement, connection of a host interface unit 4 or a disk interface unit 6 having an I/F of an M path with a transfer rate different from the transfer rate of an S path 10, to an M path port unit 40 becomes possible, without adversely affecting the transfer throughput of the entire system.

Figure 5:
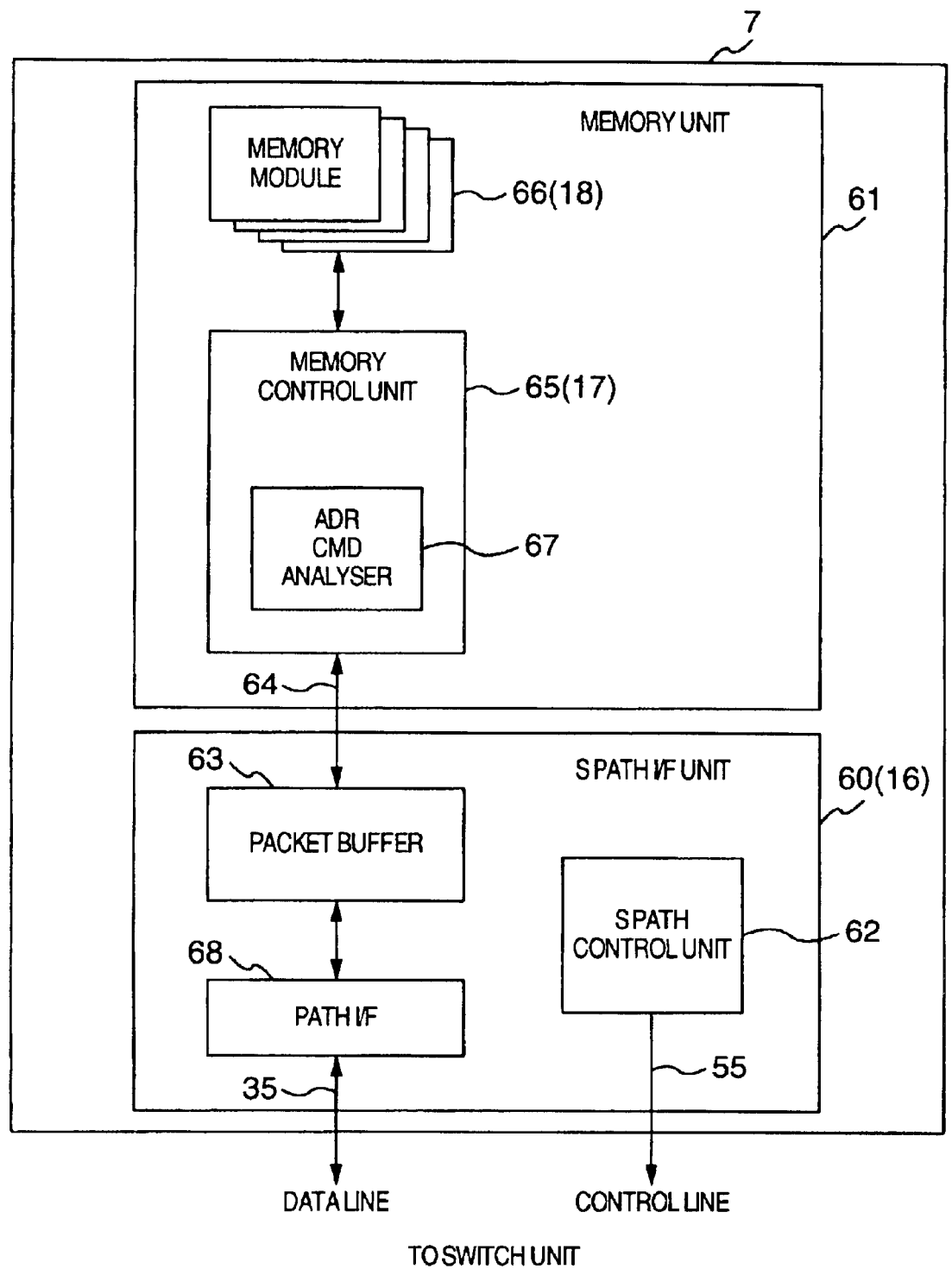
FIG. 5 is a conceptual diagram showing a configuration of a shared memory unit in the disk array control device that carries out the control method according to the embodiment of the present invention.

FIG. 5 is a conceptual diagram showing a configuration of a shared memory unit 7 in the disk array control unit 1 according to this embodiment. The shared memory unit 7 broadly comprises the S path I/F unit 60 and a memory unit 61. The S path I/F unit 60 comprises a path I/F 68 connected to the S path unit 41 of the switch unit 8, an S path control unit 62, and a packet buffer 63. While connected to the path I/F 52 of the switch unit 8 by a data line 35, the path I/F 68 is connected to a memory control unit 65 through a data line 64 via a packet buffer 63. The S path control unit 62 is connected to the S path control unit 53 of the switch unit 8 through a control line 55, and uses the data line 35 to perform data transfer to the switch unit 8 while communicating with the S path control unit 53 through the control line 55.

The memory unit 61 comprises the memory control unit 65 and memory modules 66.

An ADR/CMD analyzer 67 is present inside the memory control unit 65. The memory control unit 65 analyzes an access determination (ADR) and access command (CMD) in a data packet, transmitted through an S path 10, and performs data writing from and reading onto a memory module 66 according to a request.

Next, an operating procedure when accessing to a shared memory unit 7 will be described. When accessing the shared memory unit 7, a CHP 11 or a DKP 14 issues to a channel I/F circuit 12 or a disk I/F circuit 15 a command to start to access the shared memory unit 7.

Upon receiving the command to start to access, the channel I/F circuit 12 or disk I/F circuit 15 notifies the data transfer control unit 33 of the shared memory access control unit 13 of the start of access through a control line 36. Further, the channel I/F circuit 12 or disk I/F circuit 15 sends to the shared memory access control unit 13 the address of an access destination (hereinafter to be referred to as the ADR), access command (hereinafter to be referred to as the CMD), and sends data to be written ((hereinafter to be referred to as the DT) if only data writing is performed).

The shared memory access control unit 13 stores the sent ADR and CMD, and DT if data writing is performed, in a packet buffer 31 connected to the channel I/F circuit 12 or disk I/F circuit 15 to which the command was issued.

In most instances, two access requests from two channel I/F circuits 12 or two disk I/F circuits 15 are issued in parallel, so that the data transfer control unit 33 arbitrates these two access requests, switches a selector 30 while communicating with the switch unit 8 through a control line 37, thereby performing data transfer to the switch unit 8. At this time of data transfer, switching of the selector 30 is not simply performed for each one-packet data transfer. The data transfer control unit 33 performs control such that two packets of data transfer requests are held as long as possible in the switch unit 8, based on the information indicated by the control line 37 according to a procedure to be described below.

Figure 6:
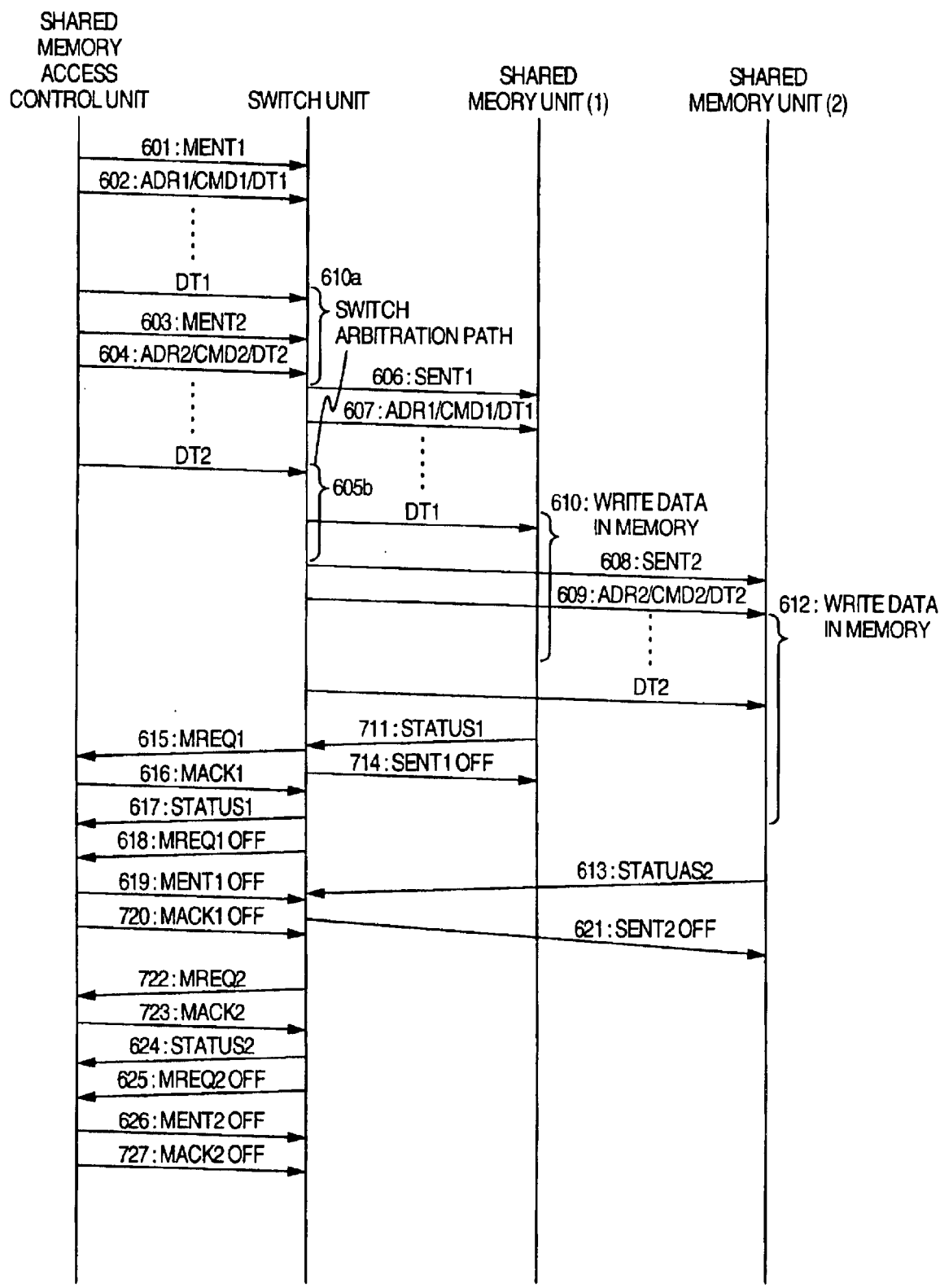
FIG. 6 is a flowchart showing an operation of the disk array system including the disk array control device that carries out the control method according to the embodiment of the present invention.

FIG. 6 is a flowchart showing an access operation when one shared memory access control unit 13 makes data writing access to two different shared memory units. Now, an operation of executing two access requests in parallel for one M path control unit 47 of the switch unit 8 by one shared memory access control unit 13 will be described with reference to FIG. 6.

First, the data transfer control unit 33 of the shared memory access control unit 13 determines the order in which two access requests are issued, by arbitration. (In this embodiment, access for writing to a shared memory unit (1), and then access for writing to a shared memory (2) are determined in this stated order.)

Next, the data transfer control unit 33 uses one of the control lines 37 to issue to an M path control unit 47 in the switch unit 8 a signal MENT1 indicating the start of the first access, in step 601. Then, an ADR1, a CMD1, and a DT1 for the first access are sent in step 602.

Next, the data transfer control unit 33 uses other one of the control lines 37 to issue to an M path control unit 47 in the switch unit 8 a signal MENT2 indicating the start of the second access, in step 603. Then, an ADR2, a CMD 2, and a DT2 for the second access are sent in step 604.

The M path control units 47 in the switch unit 8 first store in the associated packet buffers 45 corresponding to each data packets that comprise the ADRs, CMDs, and DTs, respectively, transmitted in accordance with the signals MENT1 and MENT2 from the shared memory access control unit 13. Then, upon receipt of the data packets associated with the first and second accesses, requests to arbitrate the rights to use the S paths 10, respectively, based on the result of analysis by the ADR/CMD analyzer are issued to the arbiter 43. The arbiter 43 then performs arbitration. Thereafter, if the rights to use the S paths for the first or second access are determined to be given to the M path control units 47 from which the requests were made, the arbiter 43 switches the selector unit 42 in accordance with the respective requests. The arbiter 43 also issues to the M path control units 47 signals S path ACK 51a indicating acquirement of the rights to use the S paths for the first and second accesses, respectively. The arbiter 43 also notifies the S path control units 53 of the start of access to the shared memory units 7 and the types of the CMDs in steps 605a and 605b. Referring to FIG. 6, it is assumed that the right to access the shared memory unit (1) is obtained in the first access, then the right to access the shared memory unit (2) is obtained in the second access. Description of the operation of the shared memory access control unit 13 will be given, based on this assumption.

The M path control unit 47 that has got the right to access the shared memory unit (1) sends the data packet for the first access from the packet buffer 45 to the S path port unit 41 connected to the shared memory unit (1) through the selector unit 42. The S path port unit 41 uses one of the control lines 55 to issue a signal SENT1 indicating the start of access to the shared memory unit (1), in step 606. Then, the ADR1, CMD1, and DT1 for the first access are sent in step 607.

Then, the M path control unit 47 that has got the right to access the shared memory unit (2) sends the data packet for the second access from the packet buffers 45 to the S path port unit 41 connected to the shared memory unit (2) through the selector unit 42. The S path port unit 41 uses one of the control lines 55 to issue a signal SENT2 indicating the start of access to the shared memory unit (2) in step 608. Then, the ADR2, CMD2, and DT2 for the second access are sent (step 609).

After receiving the signal SENT1 from one of the control lines 55, the S path control unit 62 of the shared memory unit (1), receives the ADR1, CMD1, and DT1 sent through a data line 35 for storage in the packet buffer 63 of the shared memory unit (1). The memory control unit 65 of the shared memory unit (1) analyzes the ADR1 and the CMD1, determines that the access was made for data writing, determines a memory module 66 into which data is written, and writes the DT 1 into the memory module 66 (step 610).

After completion of data writing into the memory module 66, the S path control unit 62 generates a status (STATUS 1) indicating an access state and then transmits the code to the switch unit 8 (step 611).

Likewise, after receiving the signal SENT 2 from one of the control lines 55, the S path control unit 62 of the shared memory unit (2) receives the ADR2, CMD2, and DT2 sent through a data line 35 for storage in the packet buffer 63 of the shared memory unit (2). The memory control unit 65 of the shared memory unit (2) analyzes the ADR2 and the CMD2, determines that the access was made for data writing, determines a memory module 66 into which data is written, and writes the DT2 into the memory module 66 (step 612).

After completion of data writing into the memory modules 66, the S path control unit 62 generates a status code STATUS 2 indicating an access state and transmits the code to the switch unit 8 (step 613).

The switch unit 8 that has received the status code from the shared memory unit (1) turns off the signal SENT1 and first stores the status code in a packet buffer 45 (step 614). The M path control unit 47, after confirming that transmission of the status code for the second access is not performed (signal MREQ2 is turned off and a signal MACK2 is also turned off), uses one of the control lines 37 to issue a signal MREQ1 indicating a request for permission to transmit the status code for the first access to the data transfer control unit 33 of the shared memory access control unit 13 (step 615). On contrast therewith, after getting ready to receive status code, the data transfer control unit 33 of the shared memory access control unit 13 uses other one of the control lines 37 to issue a signal MACK1 indicating that the status code for the first access can be received (step 616).

The switch unit 8 that has received the signal MACK1 transmits the status code STATUS1 for the first access to the data transfer control unit 33 of the shared memory access control unit 13 and then turns off the signal MREQ1 (steps 617 and 618). The data transfer control unit 33 of the shared memory access control unit 13 that has received the status STATUS1 for the first access turns off the signals MENT1 and MACK1 (steps 619 and 620). The data transfer control unit 33 of the shared memory access control unit 13 that has received the status code for the first access reports completion of the access to the channel I/F circuit 12 or disk I/F circuit 15 that has issued the request for the first access, using the control lines 36. The first access is thereby completed.

On the other hand, the switch unit 8 that has received the status code from the shared memory unit (2) turns off the signal SENT2 and first stores the status code in a packet buffer 45 (step 621). Next, the M path control unit 47, after confirming that transmission of the status code for the first access is not performed (the signal MREQ1 is turned off and the signal MACK1 is also turned off), uses one of the control lines 37 to issue the signal MREQ2 indicating a request for permission to transmit the status code for the second access to the data transfer control unit 33 of the shared memory access control unit 13 (step 622).

On contrast therewith, after getting ready to receive status code, the data transfer control unit 33 of the shared memory access control unit 13 uses other one of the control lines 37 to issue the signal MACK2 indicating that the status code for the second access can be received (step 623). The switch unit 8 that has received the signal MACK2 transmits the status code STATUS2 for the second access to the data transfer control unit 33 of the shared memory access control unit 13 to turn off the signal MREQ2 (steps 624 and 625). The data transfer control unit 33 of the shared memory access control unit 13 that has received the status STATUS2 for the second access turns off the signals MENT2 and MACK2 (steps 626 and 627). The data transfer control unit 33 of the shared memory access control unit 13 that has received the status code for the second access reports completion of the access to the channel I/F circuit 12 or disk I/F circuit 15 that has issued the request for the second access, using the control lines 36. The second access is thereby completed.

Figure 7:
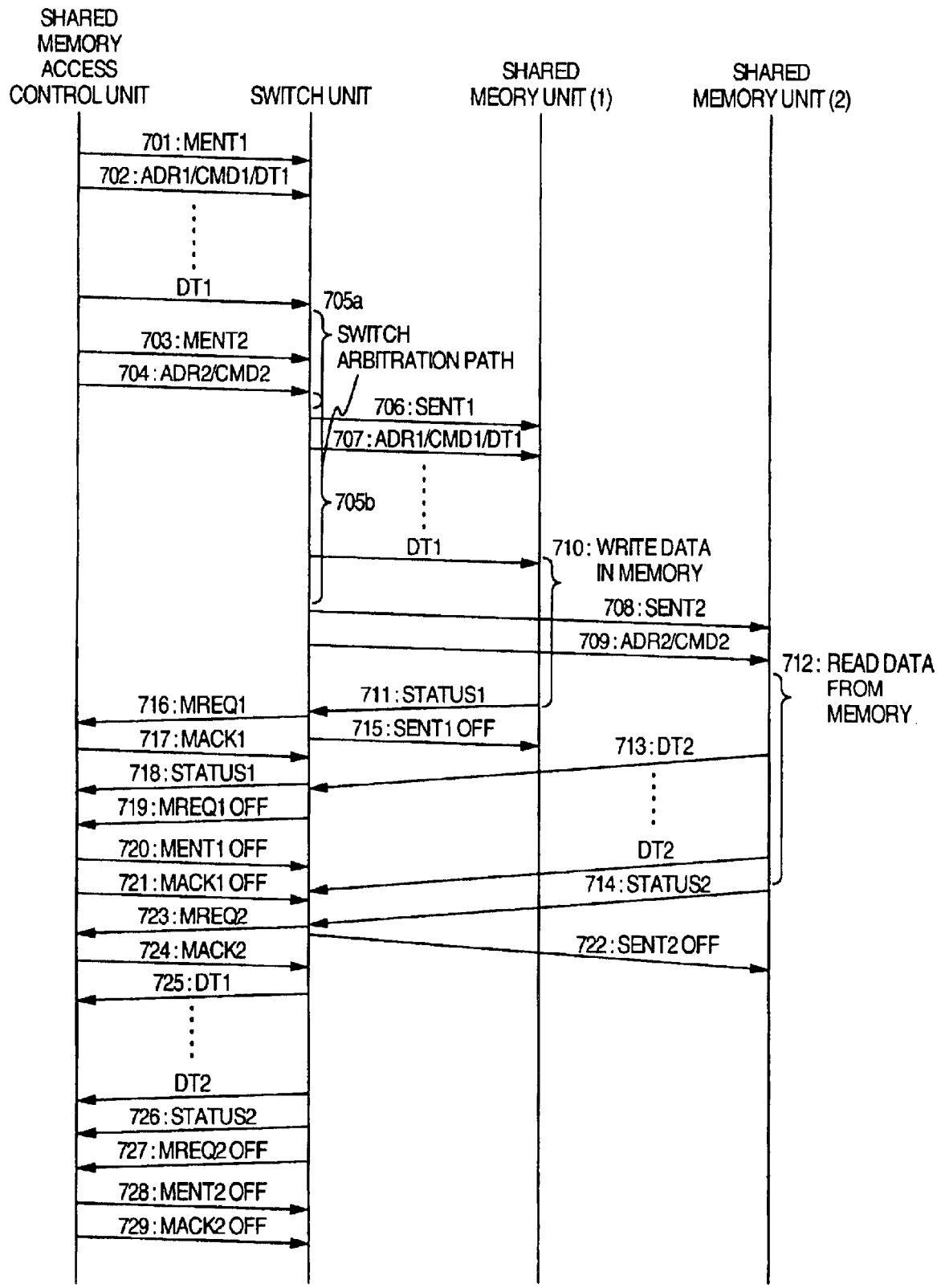
FIG. 7 is a flowchart showing an operation of the disk array system including the disk array control device that carries out the control method according to the embodiment of the present invention.

FIG. 7 is a flowchart showing an access operation when one shared memory access control unit 13 makes data writing access and data reading access to two different shared memory units, respectively. Now, an operation of executing two access requests in parallel for one M path control unit 47 of the switch unit 8 by one shared memory access control unit 13 will be described with reference to FIG. 7.

First, the data transfer control unit 33 of the shared memory access control unit 13 determines the order in which two access requests are issued, by arbitration. In this embodiment shown in FIG. 7, access for writing to the shared memory unit (1), and then access for reading from the shared memory (2) are determined in this stated order.

Next, the data transfer control unit 33 uses one of the control lines 37 to issue to an M path control unit 47 in the switch unit 8 the signal MENT1 indicating the start of the first access, in step 701. Then, the ADR1, CMD1, and DT1 for the first access are sent (step 702).

Next, the data transfer control unit 33 uses other one of the control lines 37 to issue to the M path control unit 47 of the switch unit 8 the signal MENT2 indicating the start of the second access (step 703). Then, the ADR2 and the CMD 2 for the second access are sent (step 704).

The M path control units 47 in the switch unit 8 first store in the associated packet buffers 45 corresponding to each data packets that comprises the ADRs, CMDs, and DTs, respectively, transmitted in accordance with the signals (MENT1 and MENT2) for starting access, sent from the shared memory access control unit 13. Then, upon receipt of the data packets associated with the first and second accesses, requests to arbitrate the rights to use the S paths 10, respectively, based on the result of analysis by the ADR/CMD analyzer are issued to the arbiter 43. The arbiter 43 then performs arbitration. Thereafter, if the rights to use the S paths for the first or second access are determined to be given to the M path control units 47 from which the requests were made, the arbiter 43 switches the selector unit 42 in accordance with the respective requests. The arbiter 43 also issues to the M path control units 47 the signals (S path ACK 51a) indicating acquirement of the rights to use the S paths for the first and second accesses, respectively. The arbiter 43 also notifies the S path control units 53 of the start of access to the shared memory units 7 and the types of the CMDs (steps 705a and 705b). Referring to FIG. 7, it is assumed that the right to access the shared memory unit (1) is obtained in the first access, then the right to access the shared memory unit (2) is obtained in the second access. Description of the operation of the shared memory access control unit 13 will be given, based on this assumption.

The M path control unit 47 that has got the right to access the shared memory unit (1) sends from the packet buffers 45 the data packet for the first access to the S path port unit 41 connected to the shared memory unit (1) through the selector unit 42. The S path port unit 41 uses one of the control lines 55 to issue the signal (SENT1) indicating the start of access to the shared memory unit (1) (step 706). Then, the ADR1, CMD1, and DT1 for the first access are sent (step 707).

Then, the M path control unit 47 that has got the right to access the shared memory unit (2) sends the data packet for the second access from the packet buffers 45 to the S path port unit 53 connected to the shared memory unit (2) through the selector unit 42. The S path port unit 53 uses one of the control lines 55 to issue the signal SENT2 indicating the start of access to the shared memory unit (2) (step 708). Then, the ADR2 and the CMD2 for the second access are sent (step 709).

After receiving the signal SENT1 from one of the control lines 55, the S path control unit 62 of the shared memory unit (1) receives the ADR1, CMD1, and DT1 sent through a data line 35 for storage in the packet buffer 63 of the shared memory unit (1). The memory control unit 65 of the shared memory unit (1) analyzes the ADR1 and the CMD1, confirms that the access was made for data writing, determines a memory module 66 into which data is written, and writes the DT1 into the memory module 66 (step 710).

After completion of data writing into the memory module 66, the S path control unit 62 generates the status (STATUS 1) indicating an access state and then transmits the code to the switch unit 8 (step 711).

Likewise, after receiving the signal SENT 2 from one of the control lines 55, the S path control unit 62 of the shared memory unit (2) receives the ADR2 and the CMD2 sent through a data line 35 for storage in the packet buffer 63 of the shared memory unit (2). The memory control unit 65 of the shared memory unit (2) analyzes the ADR2 and the CMD2, determines that the access was made for data reading, determines a memory module 66 from which data is read, and read the data from the memory module 66 (step 712).

The S path control unit 62 transmits the data (DT2) read from the memory module 66 to the switch unit 8, generates the status (STATUS 2) indicating an access state, and then transmits the code to the switch unit 8 (steps 713 and 714).

The switch unit 8 that has received the status code from the shared memory unit (1) turns off the signal SENT1 and also stores the status code in a packet buffer 45 (step 715). The M path control unit 47, after confirming that transmission of the status code for the second access is not performed (the signal MREQ2 is turned off and the signal MACK2 is also turned off), uses one of the control lines 37 to issue the signal (MREQ1) indicating a request for permission to transmit the status code for the first access to the data transfer control unit 33 of the shared memory access control unit 13 (step 716).

On contrast therewith, after getting ready to receive status code, the data transfer control unit 33 of the shared memory access control unit 13 uses other one of the control lines 37 to issue the signal (MACK1) indicating that the status code for the first access can be received (step 717). The switch unit 8 that has received the signal MACK1 transmits the status (STATUS1) for the first access to the data transfer control unit 33 of the shared memory access control unit 13 to turn off the signal MREQ1 (steps 718 and 719). The data transfer control unit 33 of the shared memory access control unit 13 that has received the status (STATUS1) for the first access turns off the signals MENT1 and MACK1 (steps 720 and 721). The data transfer control unit 33 of the shared memory access control unit 13 that has received the status code for the first access reports completion of the access to the channel I/F circuit 12 or disk I/F circuit 15 that has issued the request for the first access, using the control lines 36. The first access is thereby completed.

On the other hand, the switch unit 8 that has received the read data (DT2) and the status (STATUS2) from the shared memory unit (2) turns off the signal SENT2 and first stores the read data and the status code in a packet buffer 45 (step 722). Next, the M path control unit 47, after confirming that transmission of the status code for the first access is completed (the signal MREQ1 is turned off and the signal MACK1 is also turned off), uses one of the control lines 37 to issue the signal (MREQ2) indicating a request for permission to transmit the read data and the status code for the second access to the data transfer control unit 33 of the shared memory access control unit 13 (step 723).

On contrast therewith, after getting ready to receive status code, the data transfer control unit 33 of the shared memory access control unit 13 uses other one of the control lines 37 to issue the signal (MACK2) indicating that the read data and the status code for the second access can be received (step 724). The switch unit 8 that has received the signal MACK2 transmits the read data and the status (STATUS2) to the data transfer control unit 33 of the shared memory access control unit 13 to turn off the signal MREQ2 (steps 725, 726, and 727). The data transfer control unit 33 of the shared memory access control unit 13 that has received the status STATUS2 for the second access turns off the signals MENT2 and MACK2 (steps 728 and 729). The data transfer control unit 33 of the shared memory access control unit 13 that has received the read data and the status for the second access reports completion of the access to the channel I/F circuit 12 or disk I/F circuit 15 that has issued the request for the second access, using the control lines 36. The second access is thereby completed.

The above were descriptions about access operations when one shared memory access control unit 13 accesses two shared memory units in the cases where both the first and second accesses are made for data writing and where the first access is made for data writing, and the second access is made for data reading. Even in other cases, the shared memory access control unit 13 operates such that two packets of transfer requests are held in parallel for the M path control unit 47 of the switch unit 8 connected to the shared memory access control unit 13, following the same access procedure.

According to this embodiment, the M path control unit 47 of the switch unit 8 holds the number of requests to access the shared memory units 7 greater than the number of the M paths 9 connected to the M path control unit 47 of the switch unit 8. Thus, the number of data packets that are arbitrated by the switch unit can be made greater than the number of the M paths. A proportion of connecting paths between the switch unit and the shared memory units that simultaneously operate can be thereby improved without increasing the number of the M paths included. The throughput of the system can be thereby increased.

According to this embodiment, the M path control unit 47 of the switch unit 8 uses the packet buffers 45 to compensate for a difference between the transfer rate of the M path 9 and the transfer rate of the S path 10. Thus, without adversely affecting the transfer throughput of the entire system, connection of a host interface unit 4 or a disk interface unit 6 having the I/F of the M path with a transfer rate different from that of the S path 10, to an M path port unit 40 becomes possible.

According to other aspect, the present invention as set forth in claims can be defined as follows.

A disk array control system according to the present invention comprises at least one host interface unit connected to a host computer, a plurality of magnetic disk drives and at least one disk interface unit connected to the magnetic disk drives, and at least one shared memory unit for storing data and control information for the system from the host computer. The host interface unit, disk interface unit, and shared memory unit are interconnected through a switch unit. The switch unit temporarily holds the number of data packets greater than the number of access paths physically connected to the host interface unit and the disk interface unit.

The switch unit selects among temporarily held data packets a data packet, which indicates a request to access the shared memory unit that is ready to receive the request and then accesses the shared memory unit.

The disk array control system comprises physically or logically divided data packet buffers which store two or more packets of data in the I/F unit of the host interface unit or the disk interface unit connected to the switch unit.

The host interface unit and the disk interface unit respectively include a plurality of external interfaces, which operate in parallel.

A disk array control system according to the present invention comprises at least one host interface unit connected to a host computer, a plurality of magnetic disk drives and at least one disk interface unit connected to the magnetic disk drives, and at least one shared memory unit for storing data and control information for the system from the host computer. The host interface unit, disk interface unit, and shared memory unit are interconnected through a switch unit. A plurality of types of host interface units is connected to the switch unit. Access paths respectively connecting the host interface units to the switch unit have different bandwidths. The operation speed of an access path on the host interface side of the switch unit can be changed according to the host interface unit type.

The host interface unit notifies the switch unit of the type of the host interface unit connected to the switch unit. With this arrangement, the switch unit switches the bandwidth of an access path connected thereto.

A disk array control system according to the present invention comprises at least one host interface unit connected to a host computer, a plurality of magnetic disk drives and at least one disk interface unit connected to the magnetic disk drives, and at least one shared memory unit storing data and control information for the system from the host computer. The host interface unit, disk interface unit, and shared memory unit are interconnected through a switch unit. The bandwidth of an access path connecting the switch unit to the shared memory unit is different from the bandwidth of an access path physically connecting the host interface unit to the switch unit, or connecting the switch unit to the disk interface unit.

The above are specific descriptions about the present invention made by the inventor, according to the embodiment of the present invention. The present invention is not limited to the embodiment described above. Various modifications are possible within the scope claimed below.

It should be further understood by those skilled in the art that although the foregoing description has been made on embodiments of the invention, the invention is not limited thereto and various changes and modifications may be made without departing from the spirit of the invention and the scope of the appended claims.

We claim:

1. A method for controlling a disk array system including a plurality of disk drives and a disk array control device for controlling the plurality of disk drives, the disk array control device comprising:

a first interface unit for exchanging information with a host system;

a second interface unit for exchanging information with the plurality of disk drives;

a plurality of memory units shared by the first and second interface units; and switching means connected to the first and second interface units through a plurality of first paths and each of the plurality of memory units through a plurality of second paths, for controlling exchange of information in packets between the plurality of memory units, first interface unit, and second interface unit;

wherein said switching means temporarily holds information to be transferred, and information in packet form, if said information has been stored in a selected one of said memory units, from said one memory unit to said host system through said first interface and transfers information in packet form, if said information has been stored in a selected one of said disk drives, from said one disk drive to said host system through said first interface in response to a data reading instruction or transfers information in packet form from from said host system to a selected one of said memory units and transfers information in packet form from said one memory unit to a selected one of said disk drive through said second interface in response to a data writing instruction;

the method for controlling the disk array system comprising the steps of:

receiving the packets from at least one of the host system or the disk drives through the first or second interface units, by the switching means; and temporarily holding a number of the received packets greater than a number of the first paths, by the switching means.

2. The method for controlling a disk array system according to claim 1, further comprising the steps of:

sending by the first or second interface unit the packets to the switching means such that a plurality of the packets are temporarily held in the switching means, on communication with the switching means.

3. The method for controlling a disk array system according to claim 2, wherein the first or second interface unit includes a selector, and wherein the step of sending the packets to the switching means is executed by controlling switching of the selector.

4. The method for controlling a disk array system according to claim 1, wherein the step of temporarily holding the packets further includes the step of compensating for a difference between a bandwidth of each of the first paths connected to at least one of the first and second interface units and a bandwidth of each of the second paths, thereby connecting the first and second interface units to the switching means without modifying at least one of specifications for the first and second interface units.

5. The method for controlling a disk array system according to claim 4, further comprising the step of:
notifying the switching means of an operational speed of the first or second interface unit, by the first or second interface unit.

6. The method for controlling a disk array system according to claim 5, further comprising the steps of:
receiving notification on the operational speed of the first or second interface unit, by the switching means; and
changing an operational speed of an interface connected to each of the first paths according to the operational speed of the first or second interface unit, by the switching means.

7. The method for controlling a disk array system according to claim 6, wherein the step of changing the operational speed of the interface connected to said each of the first paths further comprises the steps of:
operating the interface at a high speed when the operational speed of the first or second interface unit indicates LOW; and
operating the interface at a low speed when the operational speed of the first or second interface unit indicates HIGH.

8. The method for controlling a disk array system according to claim 1, further comprising:
sequentially selecting from among the packets received by the first and second interface units the packets in an order in which the packets indicates a request to access the shared memory unit that is ready to receive the request, by the switching means; and
transmitting the packets to the shared memory unit through one of the second paths in the order the packets have been selected, by the switching means.

9. The method for controlling a disk array system according to claim 8, wherein the step of temporarily holding the packets includes the step of compensating for a difference between a bandwidth of each of the first paths connected to at least one of the first and second interface units and a bandwidth of each of the second paths, thereby connecting the first and second interface units to the switching means without modifying at least one of specifications for the first and second interface units.

10. The method for controlling a disk array system according to claim 9, further comprising the step of:
notifying the switching means of an operational speed of the first or second interface unit, by the first or second interface unit.

11. The method for controlling a disk array system according to claim 10, further comprising the steps of:
receiving notification on the operational speed of the first or second interface unit, by the switching means; and
changing an operational speed of an interface connected to each of the first paths according to the operational speed of the first or second interface unit, by the switching means.

12. The method for controlling a disk array system according to claim 11, wherein the step of changing the operational speed of the interface connected to said each of the first paths further comprises the steps of:
operating the interface at a high speed when the operational speed of the first or second interface unit indicates LOW; and
operating the interface at a low speed when the operational speed of the first or second interface unit indicates HIGH.

13. A disk array system including a plurality of disk drives and a disk array control device for controlling the plurality of disk drives, the disk array control device comprising:
a first interface unit for exchanging information with a host system;
a second interface unit for exchanging information with the plurality of disk drives;
a plurality of memory units shared by the first and second interface units; and
switching unit connected to the first and second interface units through a plurality of first paths and connected to each of the plurality of memory units through a plurality of second paths, for controlling exchange of information in packets between the plurality of memory units, first interface unit, and second interface unit;
wherein the switching means comprises a plurality of first packet buffers for temporarily holding a number of packets greater than a number of the first paths, sent from at least one of the first and second interface units and holds information in packet form which has been stored in any of the plurality of memory units in response to either a data reading instruction or a data writing information respectively issued by the host system, information held in the switching means being sent to either the host system through the first interface unit according to the data reading instruction or any of the plurality of disk drives according to the data writing instruction.

14. The disk array system according to claim 13, wherein the first or second interface unit comprises:
an access controller for sending the packets to the switching means such that a plurality of the packets are temporarily held in the switching means, on communication with the switching means.

15. The disk array system according to claim 14, wherein the access controller comprises:
a plurality of second packet buffers for temporarily holding the packets; and
a transmission controller connected to the plurality of second buffers, for controlling transmission of the packets to the switching means such that a plurality of the packets are temporarily held in the switching means.

16. The disk array system according to claim 15, wherein the first or second interface unit further includes a selector, and wherein the transmission controller controls switching of the selector, thereby temporarily holding the plurality of the packets in the switching means.

17. The disk array system according to claim 15, wherein the transmission controller notifies the switching means of an operational speed of the first or second interface unit, and wherein the switching means comprises:
a path controller for receiving notification on the operational speed of the first or second interface unit from the transmission controller and then changing an operational speed of an interface connected to each of the first paths according to the operational speed of the first or second interface unit.

18. The disk array system according to claim 17, wherein the path controller operates the interface at a high speed when the operational speed of the first or second interface unit indicates LOW, and operates the interface at a low speed when the operational speed of the first or second interface unit indicates HIGH.

19. The disk array system according to claim 13, wherein the plurality of first packet buffers compensate for a difference between a bandwidth of each of the first paths connected to at least one of the first and second interface units and a bandwidth of each of the second paths, and wherein the first and second interface units are connected to the switching means without modifying at least one of specifications for the first and second interface units.

20. The disk array system according to claim 13, wherein the switching means comprises:

a controller for selecting from among the packets received by the first and second interface units the packets in an order in which the packets indicates a request to access the shared memory unit that is ready to receive the request and transmitting the packets to the shared memory unit through one of the second paths in the order the packets have been selected.

21. A disk array system including a plurality of disk drive devices and a disk array control device for controlling the disk drive device, comprising:

a first interface unit connected to a host system for exchanging information in packet form with the host system;

a second interface unit connected to the plurality of disk drive devices for exchanging information in packet form with the plurality of disk drive devices;

a switching unit connected to the first interface unit through a part of a first paths and to the second interface unit through the other part of the first paths for holding at least one of a first kind of information sent from the host system to be written into the disk drive devices through the first interface unit and a second kind of information sent from the disk drive devices in response to a data reading instruction issued by the host system to be read out to the host system through the second interface unit, a number of the first kind of information in packet form being larger than a number of the first paths and a number of second, and a number of the second kind of information in packet form being larger than the number of the first paths; and a plurality of memory units connected to the switching unit through a plurality of second paths for storing at least one of the first and second kinds of information.

* * * * *